US009582722B2

(12) United States Patent
Bernal et al.

(10) Patent No.: US 9,582,722 B2
(45) Date of Patent: Feb. 28, 2017

(54) VIDEO-BASED VEHICLE SPEED ESTIMATION FROM MOTION VECTORS IN VIDEO STREAMS

(75) Inventors: Edgar A. Bernal, Webster, NY (US); Wencheng Wu, Webster, NY (US); Orhan Bulan, Greece, NY (US); Robert P. Loce, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 800 days.

(21) Appl. No.: 13/600,742

(22) Filed: Aug. 31, 2012

(65) Prior Publication Data

US 2014/0063247 A1    Mar. 6, 2014

(51) Int. Cl.
*H04N 7/18* (2006.01)
*G06K 9/00* (2006.01)

(52) U.S. Cl.
CPC ........... *G06K 9/00785* (2013.01); *H04N 7/18* (2013.01)

(58) Field of Classification Search
CPC ........... G06K 9/00825; G06K 9/00785; G06K 2209/19; G06K 9/00791; G06K 9/00798; G06T 2207/10016; H04N 7/18; H04N 19/00151; H04N 19/00587
See application file for complete search history.

(56) References Cited

U.S. PATENT DOCUMENTS

| | | | |
|---|---|---|---|
| 6,130,706 A * | 10/2000 | Hart, Jr. ................. | B60T 8/172 348/148 |
| 6,442,474 B1 | 8/2002 | Trajkovic et al. | |
| 6,757,328 B1 * | 6/2004 | Huang ..................... | G08G 1/04 375/240.1 |
| 2002/0072847 A1 | 6/2002 | Trajkovic et al. | |
| 2006/0279629 A1 * | 12/2006 | Hocker et al. ................ | 348/143 |
| 2008/0205710 A1 * | 8/2008 | Benten .................. | G06T 7/2026 382/107 |
| 2011/0317009 A1 * | 12/2011 | Kumaraswamy .. | G06K 9/00744 348/143 |

(Continued)

FOREIGN PATENT DOCUMENTS

| | | |
|---|---|---|
| JP | 2007-78358 | 3/2007 |
| WO | 2007/036873 A2 | 4/2007 |

OTHER PUBLICATIONS

U.S. Appl. No. 13/463,769, filed May 3, 2012, Fan et al.

(Continued)

*Primary Examiner* — Amara Abdi
(74) *Attorney, Agent, or Firm* — Fay Sharpe LLP (57) ABSTRACT

Automated low-complexity video-based vehicle speed estimation is described, that operates within the video stream to screen video sequences to identify and eliminate clear non-violators and/or identify and select potential violators within a multi-layer speed enforcement system, in which deeper layers provide enhanced accuracy on selected candidate (speeding) vehicles. Video motion vector clusters corresponding to a vehicle are identified and tracked across multiple frames of captured video. Movement of the motion vector clusters translated from pixels per second to real speed (e.g. miles per hour) to determine whether the vehicle was speeding. Estimated speed data is added to the video stream data is metadata, and video segments of candidate speeding vehicles are stored and/or transmitted for subsequent review (e.g. automated or manual).

26 Claims, 8 Drawing Sheets

(56) References Cited

U.S. PATENT DOCUMENTS

2012/0121131 A1* 5/2012 Kim .................. G06K 9/00664
                                                          382/103
2012/0308144 A1* 12/2012 Tokunaga .............. H04N 5/145
                                                          382/206
2013/0088600 A1    4/2013 Wu et al.

OTHER PUBLICATIONS http://warondriving.com/post/9215745267/los-angeles-stop-sign-cameras, accessed Aug. 30, 2012, 6 pgs.
http://www.thenewspaper.com/news/17/1742.asp, accessed Aug. 30, 2012, 1 pg.
Lima et al. "High-Definition Video Broadcast Over Core IP Networks" Optical Fiber Communication Conference 2006 and the 2006 National Fiber Optic Engineers Conference 1-1005-10, Mar. 2006, 11 pgs.
Wiegand et al. "Overview of the H.264 / AVC Video Coding Standard" IEEE Transactions on Circuits and Systems for Video Technology , Jul. 2003, pp. 1-19.
Horn et al. "Determining Optical Flow" Artificial Intelligence 17(1981): 185-203.
Huang et al. "Survey on Block Matching Motion Estimation and Algorithms and Architectures with New Results" Journal of VLSI Signal Processing: 42 (2006), pp. 297-320.
UK Patent Office Search Report for corresponding GB Application No. 1315315.0, dated Feb. 19, 2014, 1 page.
U.S. Appl. No. 13/411,032, filed Mar. 2, 2012, Kozitsky et al.
U.S. Appl. No. 13/453,089, filed Apr. 23, 2012, Wu.
http://www.redflex.com/index.php.en/2012-03-14-00-48-27/redflex-stop, accessed Aug. 30, 2012, 1 pg.

\* cited by examiner

VIDEO-BASED VEHICLE SPEED ESTIMATION FROM MOTION VECTORS IN VIDEO STREAMS

TECHNICAL FIELD

The presently disclosed embodiments are directed toward estimating vehicle speed using video motion vector information. However, it is to be appreciated that the present exemplary embodiments are also amenable to other like applications.

BACKGROUND

Video-based vehicle speed estimation is an area in which significant effort is being expended in order to develop a robust video-based speed law enforcement solution. High spatial and temporal resolutions are required to yield accurate speed estimates and to perform other traffic enforcement tasks of interest such as automatic license plate recognition (ALPR). For example, one conventional video-based speed enforcement solution uses a 4 Mpixel, 60 fps camera. Achieving real-time processing at this high data rate is extremely challenging and increases the complexity associated with screening of candidate speeders, as well as increases the processing burden encountered in off-line video analysis. Using conventional approaches, video compression may be encountered in at least two scenarios. In one, you may have access to video data as it is being compressed in the conventional manner, such as having access to the compression methods in use in a smart camera. In another scenario, you may be the receiver of video data that has been previously compressed. Conventional approaches do not accommodate computation within the compression operation or using features of the compressed data stream to screen candidates speeding vehicles.

A typical video-based vehicle speed enforcement solution has two main components: a speed estimation module and a vehicle identification module (usually an ALPR mode). Conventional approaches are faced with a significant computational burden when attempting to provide accurate speed estimation for violators in addition to accurate ALPR and near-real-time processing performance. All three requirements are interdependent and difficult to satisfy using conventional approaches. For example, speed estimation generally involves detecting a vehicle, tracking the detected vehicle's feature(s), e.g., corners of its license plate or tire edges, converting the tracked trajectory (e.g., in image pixel coordinates, etc.) to real-world coordinates (e.g., in meters, feet, etc.) through camera calibration, and estimating the vehicle's speed by computing the ratio of travelled distance to time. These steps require significant computational resources, even when processing video acquired with traditional, low-resolution, low frame rate surveillance cameras. Moreover, in order to yield accurate speed estimates and achieve the required ALPR performance, high spatial and temporal resolutions are required.

Achieving real-time processing under the high data rate constraints imposed by the performance requirements (e.g., accurate speed measurement and successful ALPR) is extremely challenging under conventional approaches. Achieving near real-time processing for speed enforcement makes desirable a system capable of identifying most (if not all) speed violators while achieving accurate speed estimation.

Video compression is employed in applications where high quality video transmission and/or archival is required. For example, a surveillance system typically includes a set of cameras that relay video data to a central processing and archival facility. While the communication network used to transport the video stream between the cameras and the central facility may be built on top of proprietary technology, traffic management centers have recently started to migrate to Internet Protocol- or IP-compliant networks. In either case, the underlying communication network typically has bandwidth constraints which dictate the use of video compression techniques on the camera end, prior to transmission. In the case of legacy analog cameras, compression is performed at an external encoder attached to the camera, whereas digital or IP cameras typically integrate the encoder within the camera itself. Typical transmission rates over IP networks require the frame rate of multi-megapixel video streams to be limited to fewer than 5 frames per second (fps). The latest video compression standards enable the utilization of the full frame rate camera capabilities for transmitting high definition video at the same network bandwidth. For example, transmission of 1080p HD uncompressed video requires a bandwidth of 1.5 Gbps, while its compressed counterpart requires only 250 Mbps; consequently, transmission of compressed video with at least 6 times the frame rate of the uncompressed version would be possible over the same network infrastructure.

Video compression is achieved by exploiting two types of redundancies within the video stream: spatial redundancies amongst neighboring pixels within a frame, and temporal redundancies between adjacent frames. This modus operandi gives raise to two different types of prediction, namely intra-frame and inter-frame prediction, which in turn result in two different types of encoded frames, reference and non-reference frames. Reference frames, or "I-frames" are encoded in a standalone manner (intra-frame) using compression methods similar to those used to compress digital images. Compression of non-reference frames (e.g., P-frames and B-frames) entails using inter-frame or motion-compensated prediction methods where the target frame is estimated or predicted from previously encoded frames in a process that typically entails three steps: (i) motion estimation, where motion vectors are estimated using previously encoded frames. The target frame is segmented into pixel blocks called target blocks, and an estimated or predicted frame is built by stitching together the blocks from previously encoded frames that best match the target blocks. Motion vectors describe the relative displacement between the location of the original blocks in the reference frames and their location in the predicted frame. While motion compensation of P-frames relies only on previous frames, previous and future frames are typically used to predict B-frames; (ii) residual calculation, where the error between the predicted and target frame is calculated; and (iii) compression, where the error residual and the extracted motion vectors are compressed and stored. Throughout the teachings herein, we use the terms "motion vector" and "compression-type motion vector" synonymously.

For video captured with a stationary camera (the category under which most traffic cameras currently deployed fall), the main cause of changes between adjacent frames corresponds to object motion. In this setting the output from the motion compensation stage is the block matching algorithm describing the way pixel blocks move between adjacent frames. As such, the encoded set of motion vectors is a good descriptor of apparent motion of objects within the field of view of the camera.

Since video compression is typically performed at the camera end prior to transmission over the network, real-time hardware implementations of popular algorithms such as H264 and MPEG4 are commonplace. Implementing speed estimation modules based on compression motion vector analysis would add a small amount of computation which is conducive to real-time performance, as already existing highly optimized hardware implementations are leveraged.

There is a need in the art for systems and methods that facilitate using video compression motion vector information to estimate speed, while overcoming the aforementioned deficiencies.

BRIEF DESCRIPTION

In one aspect, a computer-implemented method for estimating vehicle speed from video motion vector information comprises receiving video data of a moving vehicle from a camera, extracting motion vectors in the video data, identifying and analyzing at least one motion vector cluster representing the moving vehicle, and tracking a feature of the at least one motion vector cluster across a plurality of video frames. The method further comprises estimating frame-to-frame speed and mean speed of the vehicle from the motion vector cluster of the moving vehicle. Alternatively, estimation of frame-to-frame speed and mean speed of the vehicle can be achieved by a combined measure of vector lengths.

In another aspect, a system that facilitates estimating vehicle speed from video motion vector information comprises a camera that captures video data of one or more moving vehicles, a non-transitory computer-readable medium that stores computer-executable instructions for execution by a processor, and a processor configured to execute the instructions. The instructions comprise receiving video data of a moving vehicle from the camera, extracting motion vectors in the video data, and identifying and analyzing at least one motion vector cluster representing the moving vehicle. The instructions further comprise estimating frame-to-frame speed and mean speed of the vehicle from the motion vector cluster, compressing the video data, embedding estimated speed information in the compressed video stream, and storing one or more segments of the compressed video stream with embedded estimated speed information for subsequent review.

In yet another aspect, a non-transitory computer-readable medium that stores computer-executable instructions for estimating vehicle speed from video motion vector information, the instructions comprising receiving video data of a moving vehicle from a camera, extracting motion vectors in the video data, and identifying and analyzing at least one motion vector cluster representing the moving vehicle. The instructions further comprise estimating frame-to-frame speed and mean speed of the vehicle from the motion vector cluster, compressing the video data, embedding estimated speed information in the compressed video stream, and storing one or more segments of the compressed video stream with embedded estimated speed information for subsequent review.

DETAILED DESCRIPTION

The above-described problem is solved by providing automated low-complexity video-based vehicle speed estimation that operates within the compressed video stream to screen video sequences to identify and eliminate clear non-violators and/or identify and select potential violators within a multi-layer speed enforcement system, in which deeper layers provide enhanced accuracy on selected candidate vehicles.

Figure 1:
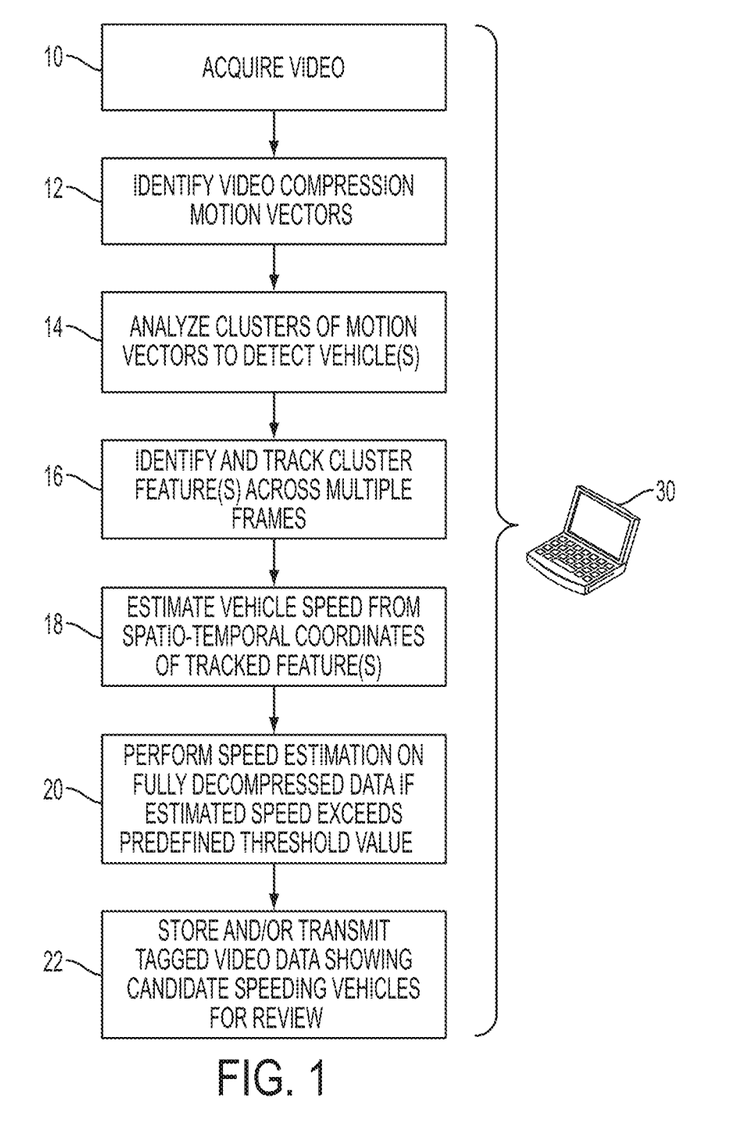
FIG. 1 illustrates a method for low-complexity automated video-based vehicle speed estimation using video compression motion vector information, in accordance with one or more features described herein.

FIG. 1 illustrates a method for low-complexity automated video-based vehicle speed estimation using video motion vector information, in accordance with one or more features described herein. At 10, video is acquired using, for example, a traffic surveillance camera (e.g., a stationary camera, a camera mounted on a vehicle, or any other suitable camera). Additionally or alternatively, compressed video that was taken with a surveillance camera is received and stored for analysis. For instance, a conventional traffic camera or other video camera may be used for capturing live video. Additionally or alternatively Internet protocol (IP) cameras may also be employed, which perform embedded video compression prior to transmission. Alternatively, the compressed video may be available from a video database where video sequences from surveillance cameras are stored.

At 12, motion vectors are calculated from the incoming, live uncompressed video stream, where the vectors are the type used for video compression. Additionally or alternatively, if compressed video has been received, motion vectors from the compressed data stream are extracted. Conventional implementations of video compression algorithms usually utilize fixed rates for reference or I-frame inclusion, typically on the order of one I-frame every 30 to 50 frames. Since I-frames do not have associated motion vectors, they need not be utilized for speed estimation purposes. Exclusion of I-frame processing does not have a noticeable impact on the speed estimation results given that they represent a small minority of frames. Alternatively, motion vectors can be estimated from an optical flow process such as those proposed by Horn-Schunk, Lucas Kanade and Black. Other types of motion vectors can be computed by establishing correspondences between salient features of the vehicle at different time instants. Such salient features include Harris corners, Scale Invariant Feature Transform (SIFT), Speeded Up Robust Features (SURF), Maximally Stable Extremal Regions (MSER) and Local Binary Patterns (LBP).

At 14, the presence of a vehicle that moves across the camera field of view is detected by analyzing clusters of the motion vectors. At 16, a feature from a cluster of vectors associated with the detected vehicle is tracked across a plurality of frames. At 18, frame-to-frame and mean speed estimation are performed from the spatio-temporal coordinates of the tracked features with the aid of calibration data. Alternatively, estimation of frame-to-frame speed and mean speed of the vehicle can be achieved by a combined measure of vector lengths. The relevant information about the estimated speed may be embedded in the compressed video stream in the form of metadata (e.g., tags or the like). At 20, if estimated speed exceeds a pre-defined vehicle speed threshold (e.g., 10 mph over the speed limit for the monitored portion of road or highway, 10% over the speed limit for the monitored portion of road or highway, or some other predetermined vehicle speed threshold), traditional speed estimation can be performed on the fully decompressed data, if desired. Note that a threshold for too slow of a speed can also be applied for tagging. Or more generally, if the estimated speed of a vehicle falls outside of a defined range, tagging can also be applied. At 22, the tagged video data or segments thereof showing candidate vehicles (e.g., vehicles identified as speeding vehicles) are stored and/or transmitted for additional review (e.g., automated review, manual review by human, etc.) and/or confirmation of vehicle speed for citation (e.g., a speeding ticket) issuance or the like. Building the speed estimation directly into the compression facilitates embedding speed estimation information in situ at the camera and screening in real-time.

It will be appreciated that the method of FIG. 1 can be implemented by a computer 30, which comprises a processor (such as the processor 124 of FIG. 6) that executes, and a memory (such as the memory 126 of FIG. 6) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 6), a system memory (see, e.g., FIG. 6), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
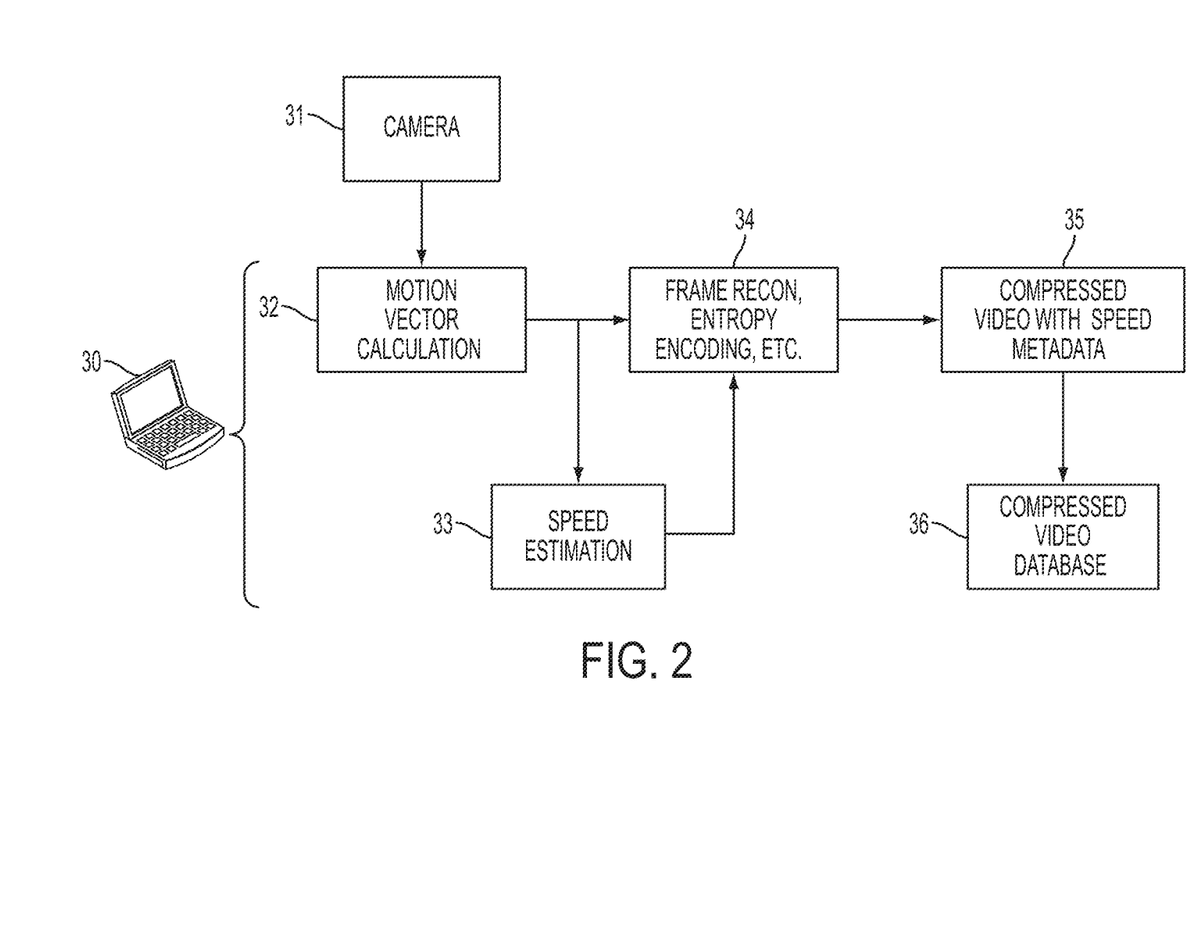
FIG. 2 illustrates a high level overview of a system that facilitates estimating vehicle speed using video compression motion vector information, in accordance with one or more aspects described herein.

FIG. 2 illustrates a high level overview of a system for performing the method of FIG. 1, in accordance with one or more aspects described herein. The system facilitates performing video-based vehicle speed estimation within the compression video stream, and comprises hardware and/or software modules that may be executed on a computer 30. The system uses motion vectors associated with video compression, which are typically calculated as one of the compression steps prior to archiving or transmission of the captured video stream, or are readily available from the compressed data stream. Building the speed estimation directly into the compression step introduces a small amount of computation, which is not detrimental to real-time performance. This embedded feature of the system mitigates a need for further processing at a server (e.g., full decompression, speed estimation, recompression, etc.). In another embodiment, the system can be implemented in a central processor that has access to the compressed video data. This feature enables violation detection using decompression of only the motion vectors, rather than decompression of the complete video.

According to FIG. 2, a traffic surveillance camera 31 captures video of a region of interest, typically a street or highway. Vehicle speed estimation is performed as a minor addition to the video compression procedure as explained in more detail below. If speed estimates indicate that a given target vehicle is speeding, a speed estimation process from decompressed data can be performed in order to obtain a more accurate speed estimate for enforcement. Frames that capture the frame sequence from which speed is estimated can be encoded as reference frames to facilitate the execution of other speed estimation algorithms as well as future searches. Note that this method also applies to vehicles that are moving too slowly, or more generally that are moving at a speed outside a defined range.

Accordingly, the system includes the traffic surveillance camera 31 (or other suitable video recording device) that acquires video of passing vehicles. The system further includes a motion vector calculation module 32 that determines motion vectors from the incoming live uncompressed video stream (or a recorded video stream received from traffic video database or the like), wherein the motion vectors are of a type used for video compression. In another embodiment, if compressed video is being processed, only motion vectors from the compressed data stream need to be decompressed. Alternatively, motion vectors can be estimated from an optical flow process such as those proposed by Horn-Schunk, Lucas Kanade and Black. Other types of motion vectors can be computed by establishing correspondences between salient features of the vehicle at different time instants. Such salient features include Harris corners, Scale Invariant Feature Transform (SIFT), Speeded Up Robust Features (SURF), Maximally Stable Extremal Regions (MSER) and Local Binary Patterns (LBP).

The system further includes a speed estimation module 33 that detects the presence of a vehicle that moves across the camera field of view by analyzing clusters of motion vectors whose length is above a predetermined threshold (e.g., 5 pixels, 9 pixels, or some other predefined threshold vector length. The speed estimation module 33 also locates and tracks the vehicle, across multiple frames, a feature from the cluster of vectors associated with the detected vehicle, and performs frame-to-frame and mean speed estimation from the spatio-temporal coordinates of the tracked features through the use of calibration data and a calibration process. Alternatively, module 33 can estimate speed from a measure of motion vector lengths from the cluster. From the cluster, the speed estimation is performed using vectors that are determined to correspond to the expected vehicle trajectory. Extraneous vectors and information can be trimmed from the cluster through means such as median filtering, outlier rejection and other regularization techniques. For example, vectors pointing in spurious directions or having disproportionate lengths can be excluded from further processing for speed estimation. Vector lengths in pixels units can be converted to real-world coordinates through the use of calibration data and a calibration process. From the resulting vector field the speed can be estimated from some combined measure of vector lengths using methods such as trimmed averaging, weighted linear averaging, order-statistic processing (e.g., median, max, 95%, min, . . . ), or other statistical estimation methods (e.g., mode).

The calibration data provides the transformation of converting image pixel coordinates to real-world coordinates and thus is used to derive the vehicle speed in term of meaningful physical unit rather than simple pixel unit. One method of obtaining such calibration data is to identify or measure the image pixel coordinates and real-world coordinates of a few reference points in the field of view of the camera (e.g. temporally block the traffic, place traffic cones at known locations, and acquire a frame of a few frame of a video of such scene). Another method that does not require interruption of regular traffic is described in U.S. patent application Ser. No. 13/527,673, which is hereby incorporated by reference in its entirety herein. The relevant information about the estimated speed may be embedded in the compressed video stream in the form of metadata. In one embodiment, if estimated speed exceeds a pre-defined threshold value, the speed estimation module 33 performs speed estimation on the fully decompressed data to calculate a more accurate estimate of the speed for law enforcement. In this manner the speed estimation module is responsible for providing functionality that facilitates the performance of acts 14, 16, 18, and 20 of the method of FIG. 1.

Since the system of FIG. 2 processes information conveyed by motion vectors, the described techniques can alternatively be executed on already-compressed video streams without the need to decompress the entire video, thus making it more computationally efficient than conventional approaches, which perform complex operations (e.g., background estimation, motion detection, object or feature tracking, etc.) on the fully decompressed video stream. The proposed systems and methods also have application in the processing of stored video that is already compressed for historical data analysis, for example.

With continued reference to FIGS. 1 and 2, the systems and methods described herein facilitate estimating vehicle speed with only minimal additional processing with respect to the video compression algorithm at the point of execution, be it the analog to digital converter in the case of analog cameras or the camera itself in the case of digital or IP cameras.

As described at 12 (FIG. 1), vectors are extracted as part of the motion estimation stage in the compression process. While motion vectors comprehending the full video frame are computed at compression, it should be clear from the description of subsequent steps that processing of motion vectors located within the confines of the moving vehicle is sufficient for robust speed estimation. Although motion vectors between two adjacent frames in a video sequence can be extracted using a pixel-level optical flow method, which entails the calculation of motion vectors for each pixel in each non-reference frame (and is thus highly computationally expensive), compression algorithms such as H264 and MPEG4 typically employ block-based approaches. Motion vectors in block-based approaches describe motion of matching blocks across adjacent frames and their computation requires significantly less computational resources when compared to pixel-level methods.

Figure 3A:
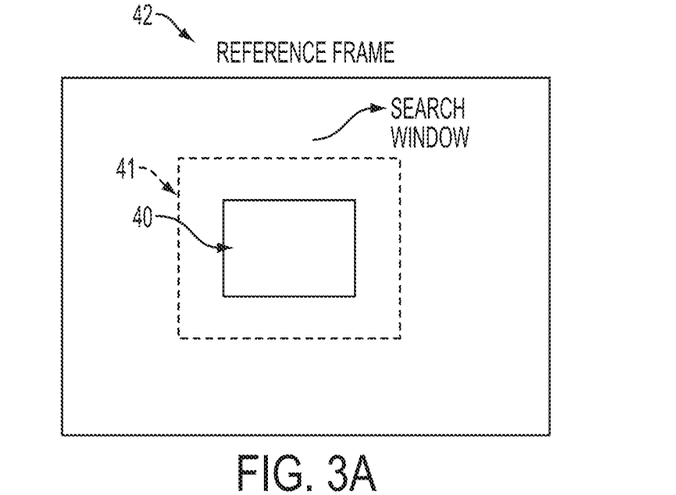
FIG. 3A shows a reference block and search window in reference frame.
Figure 3B:
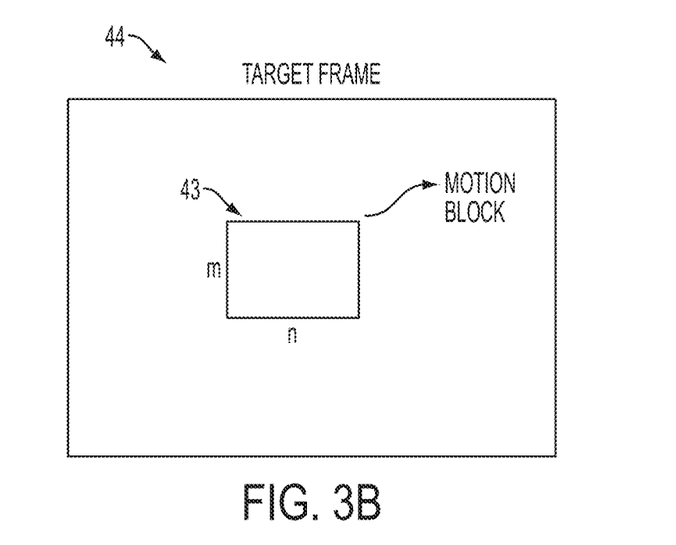
FIG. 3B shows a target block in a target frame.

FIGS. 3A and 3B depict a graphical description of a block matching algorithm. FIG. 3A shows a reference block 40 and search window 41 in reference frame 42. FIG. 3B shows a target block 43 in a target frame 44. A block matching algorithm or module executed by processor breaks up the frame to be compressed (the target frame) into pixel blocks of a predetermined size. The size of a motion block may be denoted by m×n pixels, where typically m=n=16 pixels. A search is performed by the processor in the reference frame for the block that is most similar to the current m×n target pixel block. Since searching and calculating similarity metrics is a computationally expensive process, a search window is typically defined around the location of the target motion block as shown in FIG. 3A. Examples of similarity criteria between the blocks are, e.g., the mean squared error (MSE) and the mean absolute difference (MAD), which are calculated as:

$$\text{MSE}(d_1,d_2)=\Sigma(B(k,l,j)-B(k+d_1,l+d_2,j-1))^2 \quad (1)$$

$$\text{MAD}(d_1,d_2)=\Sigma|B(k,l,j)-B(k+d_1,l+d_2,j-1)| \quad (2)$$

where $B(k,l,j)$ denotes the pixel located on the k-th row and l-th column of the m×n block of pixels in the j-th frame. In this case, the (j−1)-th frame is the already encoded frame being used as a reference frame, and the j-th frame is the target frame. Since both MSE and MAD measure how dissimilar two blocks are, a block similarity measure can then defined as the reciprocal or the negative MSE or MAD. The motion vector for the target pixel block is the vector $(d_1,d_2)$ that maximizes the block similarity measure between the target and reference blocks. The search for the best matching block in the search window can be conducted using full extensive search, binary search, three step search, spiral search algorithms, etc.

Figure 4A:
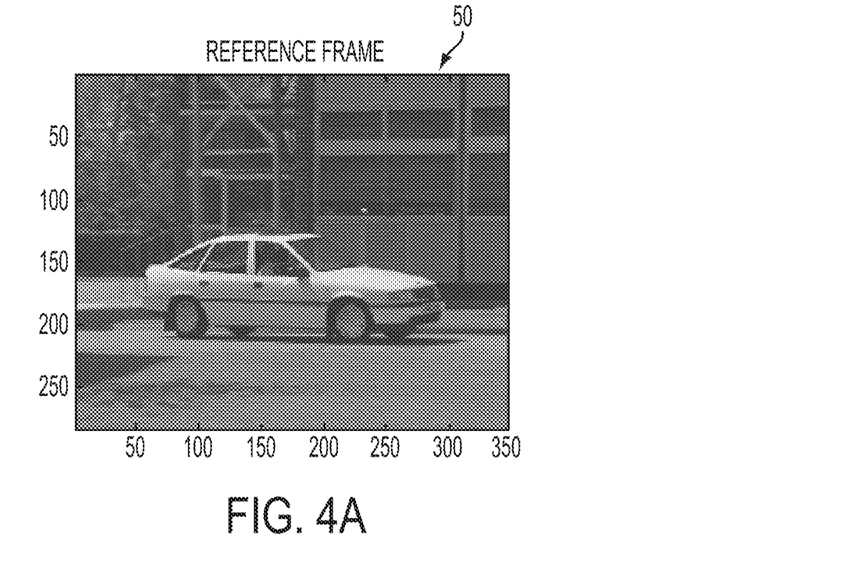
FIG. 4A illustrates a reference frame in a video sequence of a vehicle.
Figure 4B:
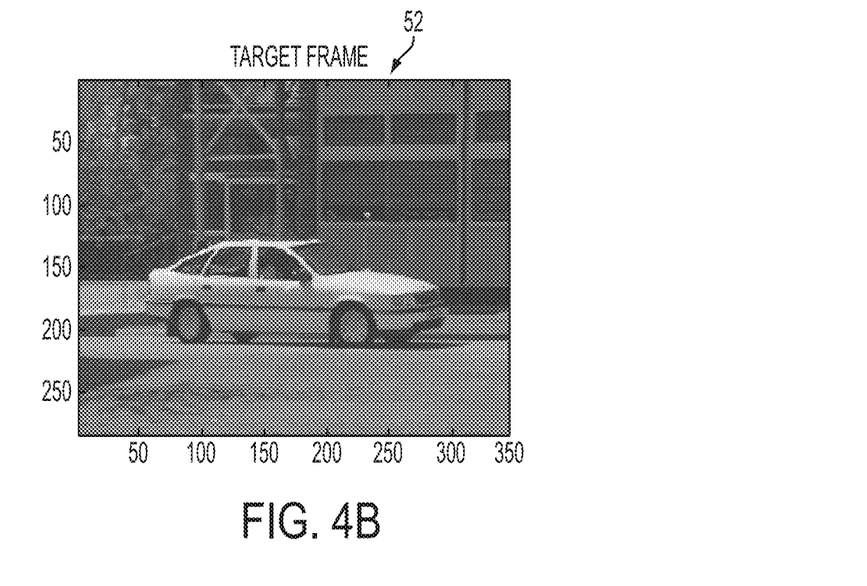
FIG. 4B illustrates a target frame in a video sequence of a vehicle.
Figure 4C:
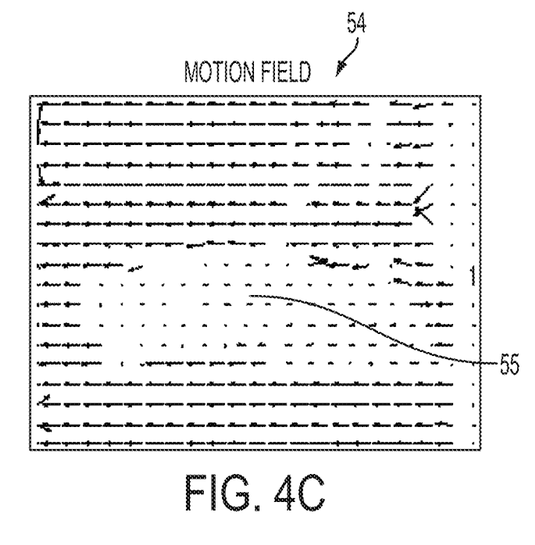
FIG. 4C illustrates a motion field resulting from the application of a 16×16 pixel block-based motion estimation algorithm with a 48×48 pixel search.
Figure 4D:
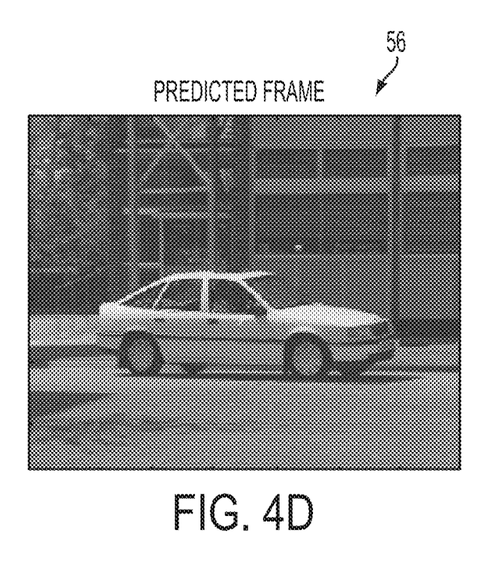
FIG. 4D shows the predicted image that results from stitching together the best-matching reference blocks.

FIGS. 4A and 4B illustrate, respectively, a reference frame 50 and a target frame 52 in a video sequence of a vehicle. FIG. 4C illustrates a motion field 54 resulting from the application of a 16×16 pixel block-based motion estimation algorithm with a 48×48 pixel search to the reference frame depicted in FIG. 4A and the target frame from FIG. 4B. A motion vector cluster 55 is identified for tracking across multiple frames to facilitate speed estimation. FIG. 4D shows the predicted image 56 that results from stitching together the best-matching reference blocks. In this scenario, the camera is physically tracking the car so it pans from left to right as the car moves. As a consequence, all apparent movement that is captured by the motion field is that of the background moving from left to right relative to the camera.

Figure 5A:
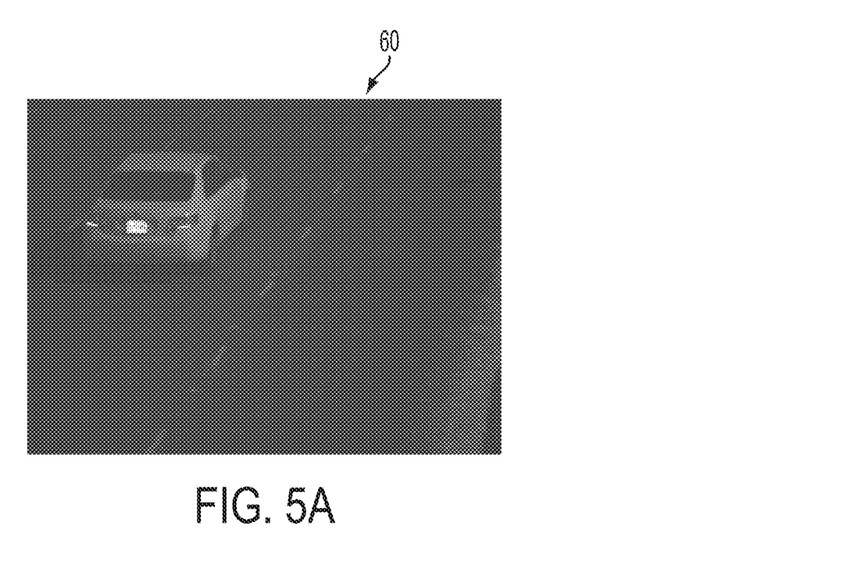
FIG. 5A shows a 1728×2304 pixel reference frame within a video sequence.
Figure 5B:
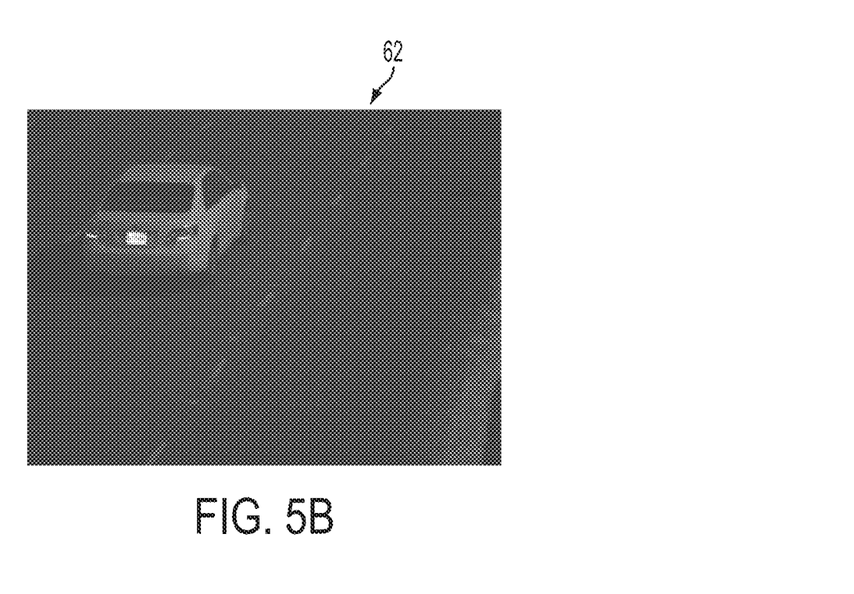
FIG. 5B shows a 1728×2304 pixel target frame within a video sequence.
Figure 5C:
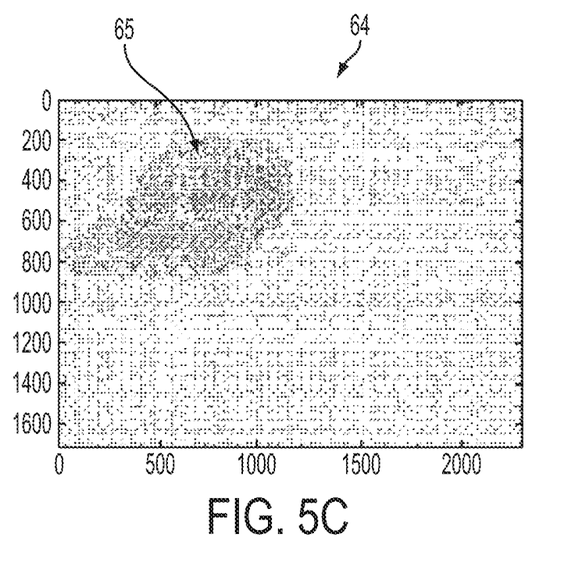
FIG. 5C shows a 16×16 pixel block motion vector field and an identified motion vector cluster that is tracked over multiple frames to facilitate speed estimation.
Figure 5D:
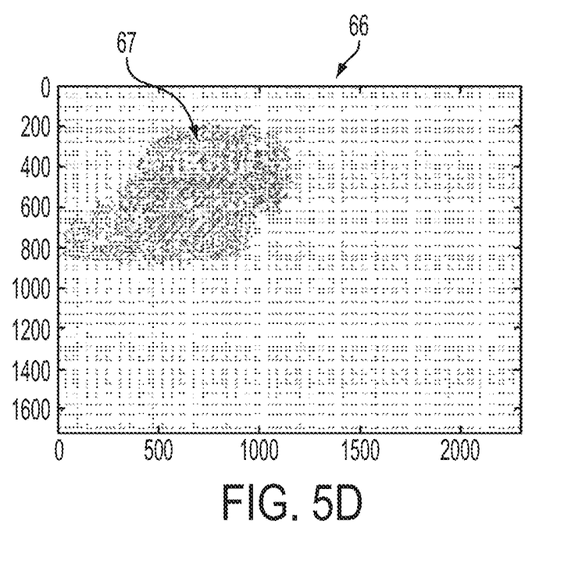
FIG. 5D shows a motion field containing active motion vectors only, wherein the predetermined threshold is set to T=9.

FIGS. 5A-5D illustrate how knowledge of motion vectors for a given target frame can be used in conjunction with the location of the target virtual area in order to trigger a vehicle detection event, such as is done at 14 (FIG. 1) when detecting the presence of a vehicle by using a cluster of the motion vectors that are above a threshold in length. In order to avoid false positives due to fictitious sources of motion such as camera shake, moving leaves and clouds, water waves, etc., only motion vectors with a magnitude larger than a predetermined threshold T are considered. These are denoted active motion vectors. The motion blocks associated with such motion vectors are called active motion blocks and indicate the existence of a moving object in the area captured by the blocks. FIGS. 5A and 5B show two 1728×2304 pixel adjacent frames of reference frame 60 (FIG. 5A) and a target frame 62 (FIG. 5B) within a video sequence. FIG. 5C shows the corresponding 16×16 pixel motion vector field 64 and an identified motion vector cluster 65 that will be tracked over multiple frames to facilitate speed estimation. The motion vector cluster 65 is a representation of the vehicle in the image frame of FIG. 5A. FIG. 5D shows a motion field 66 containing active motion vectors only, wherein the predetermined threshold is such that T=9. FIG. 5D also shows an identified motion vector cluster 67 that will be tracked over multiple frames to facilitate speed estimation. The motion vector cluster 67 is a representation of the vehicle in the image frame of FIG. 5B.

A car in motion across the field of view of the camera triggers a number of active motion vectors, as shown by the clusters 65, 67. In order to avoid false positives due to active motion vectors produced by apparent motion of objects different than cars (e.g., leaves, branches, grass, etc.), only connected clusters of more than N, where N is an integer, active motion vectors are considered. The choice for N will typically depend on the geometry of the camera setup, the typical vehicle speed on the highway being monitored, the resolution of the video sequence, as well as on the size of the blocks used in the motion estimation algorithm. The active motion field of FIG. 5D was computed using N=4.

As stated above with regard to 16 (FIG. 1), a feature from the cluster of vectors associated with the detected vehicle is located and tracked across multiple frames. Once a vehicle has been detected, a salient feature from its associated active vector cluster is tracked across frames. Tracking the spatial location of the selected feature across time facilitates speed estimation. For a non-stereo imaging device (e.g. single camera), the selection of the feature being tracked may have a significant impact on the accuracy of the speed estimates. Consequently, tracking a feature that is as close to the ground as possible becomes desirable. While specific knowledge about the characteristics of the vehicle is not available without performing full frame decompression, the spatial characteristics of the active motion clusters associated with a car in motion provide cues regarding the appearance of the vehicle. For example, approximate information regarding the location of the roofline and tires of the car can be extracted from the active motion vector field from FIG. 5B (optionally at a lower resolution than the native resolution of the video frames due to the subsampling effects of the motion vector computation from block matching). In one example, a binary template with the approximate appearance of a tire in the active motion vector field space is created and correlated with the active motion blob. The location at which the correlation reaches its largest value is assumed to be the approximate location of the tire. Since this operation is performed in a subsampled, binary space, it can be performed very quickly. The smaller the motion blocks, the better the localization accuracy but the higher the computation expense. At each motion field, the output of this stage is the estimated location of the rear tire of the vehicle.

As stated above with regard to 18 (FIG. 1), frame-to-frame and mean speed estimation are performed using the spatio-temporal coordinates of the tracked features with the help of calibration data. Once the approximate rear tire location is determined, the temporal progress of the feature is tracked to determine instantaneous (frame to frame) and average speed estimates. It will be appreciated that the spatial location of the feature being tracked can be computed in terms of pixels. In order to convert pixel locations to real-world coordinates, a calibration procedure is performed. The calibration process is executed in the form of a projective transformation that converts pixel coordinates to real-world coordinates given an assumed feature height to the road. The projective transformation is derived from the calibration data mentioned previously.

Table 1 shows a sample temporal sequence of estimated tire locations in both pixel and real-life coordinates $(x_n, y_n)$ in feet (for frame n), as well as the estimated instantaneous speed in mph for each pair of adjacent frames. The norm of vector $(x_n - x_{n-1}, y_n - y_{n-1})$ is the distance (in feet) the vehicle travels from frame n−1 to frame n. Since the frame rate of the camera is known (e.g., 30 fps), instantaneous speed can be computed. The estimated average speed of the vehicle between frames 105 and 122 in the example of Table 1 is 31.6 mph. The measured ground truth speed is 31.2 mph.

TABLE 1

Computation of instantaneous and average speed from calibrated feature position data.

| Frame Number | Pixel Row | Pixel Column | $x_n$ | $y_n$ | $\| (x_n - x_{n-1}, y_n - y_{n-1}) \|$ | Instantaneous speed (mph) |
|---|---|---|---|---|---|---|
| 105 | 1256.5 | 1848.5 | 13.90383 | −23.8106 | | |
| 106 | 1208.5 | 1848.5 | 13.73059 | −22.2349 | 1.584841 | 32.41721 |
| 107 | 1176.5 | 1880.5 | 13.89081 | −21.1207 | 1.12521 | 23.01566 |
| 108 | 1128.5 | 1896.5 | 13.85487 | −19.4424 | 1.678742 | 34.33789 |
| 109 | 1096.5 | 1928.5 | 14.01757 | −18.2688 | 1.184762 | 24.23376 |
| 110 | 1064.5 | 1912.5 | 13.7578 | −17.1263 | 1.17166 | 23.96577 |
| 111 | 1000.5 | 1928.5 | 13.65646 | −14.7081 | 2.420341 | 49.50697 |

TABLE 1-continued

Computation of instantaneous and average speed from calibrated feature position data.

| Frame Number | Pixel Row | Pixel Column | $x_n$ | $y_n$ | $\|(x_n - x_{n-1}, y_n - y_{n-1})\|$ | Instantaneous speed (mph) |
|---|---|---|---|---|---|---|
| 112 | 984.5 | 1960.5 | 13.8858 | −14.0532 | 0.693875 | 14.19289 |
| 113 | 936.5 | 1976.5 | 13.84735 | −12.1419 | 1.911704 | 39.10304 |
| 114 | 888.5 | 2008.5 | 13.95851 | −10.1452 | 1.999866 | 40.90636 |
| 115 | 856.5 | 2008.5 | 13.83118 | −8.80197 | 1.349206 | 27.59739 |
| 116 | 808.5 | 2040.5 | 13.94534 | −6.68727 | 2.117783 | 43.3183 |
| 117 | 776.5 | 2056.5 | 13.9713 | −5.24223 | 1.445267 | 29.56228 |
| 118 | 760.5 | 2056.5 | 13.90542 | −4.51694 | 0.72828 | 14.89664 |
| 119 | 712.5 | 2072.5 | 13.86403 | −2.26693 | 2.250386 | 46.03062 |
| 120 | 696.5 | 2072.5 | 13.79586 | −1.50542 | 0.764559 | 15.63872 |
| 121 | 648.5 | 2104.5 | 13.91651 | 0.878909 | 2.387377 | 48.83272 |
| 122 | 616.5 | 2120.5 | 13.94376 | 2.511717 | 1.633036 | 33.403 |
|  |  |  |  |  | Average Speed | 31.6 |

As described with regard to 20 (FIG. 1), if estimated speed exceeds a predetermined threshold, speed estimation can be performed on decompressed data to calculate a more accurate estimate of speed. In one example, a video-based speed estimation technique employs a layered approach to speed estimation, in which a first, highly computationally efficient layer (performing an algorithm such as the one herein) separates candidate speeding vehicles from those travelling at lawful speeds. Deeper layers of the system, with higher computational complexity and accuracy could then proceed to estimate the speed of candidate vehicles.

The following example is provided by way of illustration and not attended to be construed as limiting sense. In this example, acquired video has a spatial resolution of 1728×2304 pixels (4 Mpixel) at a rate of 60 fps. In order to stray as little as possible from the typical implementations of MPEG4 and H264, the motion estimation block size is set at 16×16 pixels with a search range of +/−8 pixels along each direction, both of which exhibit the recommended basic unit sizes for motion compensated prediction in a number of important coding standards. A total of 1447 frames containing 10 different vehicles travelling at speeds ranging from 29 to 61 mph were processed.

Table 2 shows the ground truth as well as estimated speeds for each of the ten vehicles in the video. Ground truth can be obtained using, for example, a Vitronic LIDAR system with an advertised 1% speed measurement accuracy. The accuracy (e.g., a percentage relative to the ground truth) of the systems and methods described herein is measured according to the formula $100 \times |v_E - v_T|/v_T$, where $|\cdot|$ denotes the absolute value operation, $v_E$ corresponds to the estimated speed and $v_T$ corresponds to the ground truth speed as measured by the Vitronic system. The results shown in Table 2 indicate that describe systems and methods provide an efficient solution for screening out clear non-violators (or clear violators, depending on the system configuration and intent) at the top layer within a multi-layered speed enforcement application.

TABLE 2

Summary of algorithm performance in terms of speed estimation accuracy.

| Ground Truth Speed (mph) | Estimated Speed (mph) | Speed Accuracy (%) |
|---|---|---|
| 31.2 | 31.6 | 1.51 |
| 29.8 | 29.7 | 0.37 |
| 29.0 | 30.0 | 3.67 |
| 29.3 | 29.9 | 2.36 |
| 29.9 | 30.1 | 0.74 |
| 56.4 | 57.3 | 1.67 |
| 60.7 | 58.7 | 3.26 |
| 58.6 | 56.8 | 3.03 |
| 58.9 | 55.5 | 5.80 |
| 58.5 | 58.4 | 0.11 |
|  | Average Accuracy | 2.25 |

Starting from the premise that motion-compensated video compression can be performed in real time, and can be embedded in the hardware of commercially available IP cameras, the implementation of the algorithm in the described systems and methods adds only a negligible amount of additional computational software and hardware to typical video compression computational requirements. All operations involved in the algorithm are performed in a spatially subsampled image space (with subsampling rate equal to the dimensions of the motion blocks), which is also binary (because only motion blocks with lengths greater than pre-specified thresholds are taken into account). The operations involved are computationally efficient morphological operations (e.g., erosions and closings) and binary template correlations. In terms of storage and memory, and as opposed to traditional tracking algorithms, a need for multi-frame buffering is mitigated since the tracking can be performed from an array of numerical values containing the history of the locations of the vehicle feature being tracked.

It will be appreciated that while frame-to-frame instantaneous speed estimation is described herein, other approaches are contemplated. For example, measuring the travel time of the vehicle between two virtual landmarks can provide an estimate of average speed. One advantage of frame-to-frame instantaneous estimates is that multiple measurements can be averaged, which leads to an overall estimate that may be more robust to outliers than two-point average speed methods. Also, it will be noted that the computation of motion vector fields as described herein is performed when encoding non-reference frames (P- and B-frames) and, as such, feature tracking need not be performed on reference frames (I-frames). Accordingly, the described systems and methods automatically keep track of an increased length of the tracking interval (e.g., when tracking is performed between the two non-reference frames adjacent to the reference frame) for speed estimation purposes. Since conventional video encoders introduce a reference frame every second or so (i.e., every 30/60 frames in 30/60 fps systems), the total number of reference frames represents a significant minority of the total frames used in the speed estimation process.

Figure 6:
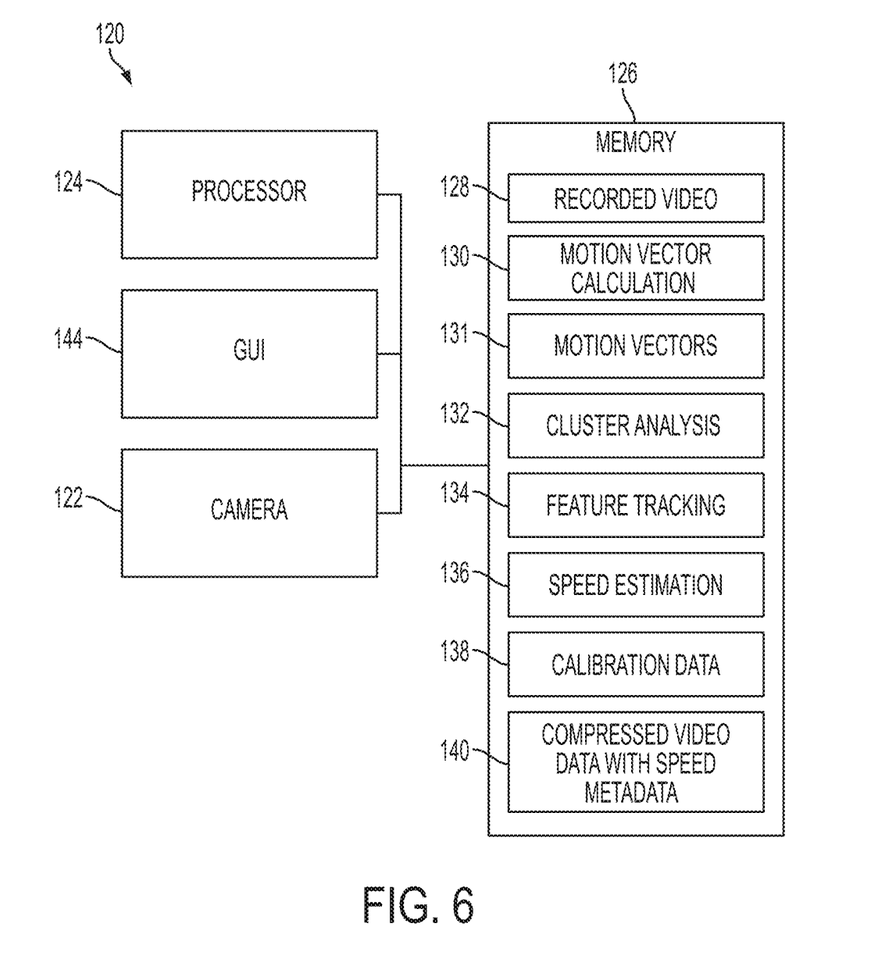
FIG. 6 illustrates a system that facilitates using video compression motion vector information to estimate vehicle speed, in accordance with one or more aspects described herein.

FIG. 6 illustrates a system 120 that facilitates using video compression motion vector information to estimate vehicle speed, in accordance with one or more aspects described herein. The system is configured to perform the method(s), techniques, etc., described herein with regard to the preceding figures, and comprises a camera 122, which is coupled to a processor 124 that executes, and a memory 126 that stores computer-executable instructions for performing the various functions, methods, techniques, steps, and the like described herein. The camera 122 may be a stationary traffic surveillance camera, camera mounted on a vehicle such as a police cruiser or emergency response vehicle, or any other suitable camera for recording video. The processor 124 and memory 126 may be integral to each other or remote but operably coupled to each other. In another embodiment, the processor and memory reside in a computer (e.g., the computer 30 of FIG. 1) that is operably coupled to the camera 122.

As stated above, the system 120 comprises the processor 124 that executes, and the memory 126 that stores one or more computer-executable modules (e.g., programs, computer-executable instructions, etc.) for performing the various functions, methods, procedures, etc., described herein. "Module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Recorded video 128 captured by the camera 122 stored in the memory 126. Additionally or alternatively, video that has been captured and compressed by the camera 122 can be received and stored in the memory 126 for analysis by the processor 124. For instance, a conventional traffic camera or other video camera may be used for capturing live video. Additionally or alternatively Internet protocol (IP) cameras may also be employed, which perform embedded video compression prior to transmission. Alternatively, compressed video may be available from a video database (not shown) where video sequences from surveillance cameras are stored.

The motion vector calculation module 130, which may be a video compression module or the like, is executed by the processor to calculate motion vectors 131 from the incoming, live uncompressed video stream, where the vectors are the type used for video compression. Additionally or alternatively, if compressed video has been received, motion vectors from the compressed data stream are extracted by the motion vector calculation module.

A cluster analysis module 132 is executed by the processor to detect the presence of a vehicle that moves across the camera field of view by analyzing clusters of the motion vectors. The feature tracking module 134 is executed by the processor to track a feature from a cluster of vectors associated with the detected vehicle across a plurality of frames. The speed estimation module and 136 is executed by the processor to estimate frame-to-frame and mean speed from the spatio-temporal coordinates of tracked features with the aid of calibration data 138. Alternatively, estimation of frame-to-frame speed and mean speed of the vehicle can be achieved by a combined measure of vector lengths. The relevant information about the estimated speed may be embedded in a compressed video data 140 in the form of metadata, which is stored and/or transmitted (e.g. by one or more of the wired connection, wireless connection, cellular connection, Wi-Fi connection, Bluetooth connection, or any other suitable manner of transmitting the tagged video data) for additional review (e.g., automated review, manual review by human, etc.). If estimated speed exceeds a predefined threshold, speed estimation can be performed on the fully decompressed data. Building the speed estimation directly into the compression facilitates embedding speed estimation information in situ at the camera and screening in real-time. Note that this method also applies to vehicles that are moving too slowly, or more generally outside a defined range.

In another embodiment, one or more of motion vector plots, speed estimation information, video data, or the like is displayed graphically on a graphical user interface 144 that may be integral to the system, remote but operably coupled thereto, or may reside on a computer such as the computer 30 of FIG. 1.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for estimating vehicle speed from video motion vector information, comprising:
   receiving video data of a moving vehicle from a camera;
   extracting motion vectors in the video data;
   identifying and analyzing at least one motion vector cluster representing the moving vehicle; and
   tracking at least one feature of the at least one motion vector cluster across a plurality of video frames; and
   estimating frame-to-frame speed and mean speed of the vehicle based at least in part on spatio-temporal coordinates of the at least one tracked feature with the aid of calibration data.

2. The method of claim 1, wherein the motion vectors are at least one of motion vectors used in the compression process, motion vectors extracted from optical flow data, and motion vectors establishing feature correspondences between frames at different time instants.

3. The method of claim 1, wherein estimating frame-to-frame speed and mean speed of the vehicle is achieved by a combined measure of vector lengths.

4. The method of 3, wherein the combined measure of vector lengths is one of a trimmed average, a weighted linear average, an order-statistic, and a mode.

5. The method of claim 1, wherein the motion vector cluster is regularized to eliminate vectors that are determined to not correspond to the expected vehicle trajectory.

6. The method according to claim 1, wherein the received video data is compressed video data, and wherein identifying the motion vectors comprises extracting the motion vectors from the compressed video data.

7. The method according to claim 1, wherein the received video data comprises a live uncompressed video stream, and wherein the motion vectors identified as they are generated during video compression.

8. The method according to claim 1, wherein when the estimated mean speed of the vehicle exceeds a predetermined vehicle speed threshold, the method further comprises transmitting a video segment comprising video of the vehicle, the video segment having the estimated speed information embedded therein, for vehicle speed confirmation and citation issuance.

9. The method according to claim 1, wherein when the estimated mean speed of the vehicle falls outside a predetermined vehicle speed range, the method further comprises transmitting a video segment comprising video of the vehicle, the video segment having the estimated speed information embedded therein, for vehicle speed confirmation and citation issuance.

10. The method according to claim 1, further comprising transmitting one or more segments of compressed video data having estimated speed information embedded therein to a remote location for confirmation of vehicle speed, wherein the one or more transmitted segments comprise compressed video of one or more moving vehicles that are candidates for speeding citations.

11. The method according to claim 1, further comprising, if estimated mean speed of the vehicle exceeds a predetermined vehicle speed threshold, performing speed estimation on a fully decompressed version of the video data.

12. The method according to claim 1, wherein the camera is mounted to a stationary structure.

13. The method according to claim 1, wherein the camera is mounted on a vehicle.

14. A processor configured to execute computer-executable instructions for performing the method of claim 1, the instructions being stored on a non-transitory computer-readable medium.

15. A system that facilitates estimating vehicle speed from video motion vector information, comprising:
a camera configured to capture video data of one or more moving vehicles;
a non-transitory computer-readable medium that stores computer-executable instructions for execution by a processor; and
a processor configured to execute the instructions, the instructions comprising:
receiving video data of a moving vehicle from the camera;
extracting motion vectors in the video data;
identifying and analyzing at least one motion vector cluster representing the moving vehicle;
tracking at least one feature of the at least one motion vector cluster across a plurality of video frames;
estimating frame-to-frame speed and mean speed of the vehicle based at least in part on spatio-temporal coordinates of the at least one tracked feature with the aid of calibration data;
compressing the video data;
embedding estimated speed information in the compressed video stream; and
storing one or more segments of the compressed video stream with embedded estimated speed information for subsequent review.

16. The system of claim 15, wherein the motion vectors are at least one of motion vectors used in the compression process, motion vectors extracted from optical flow data, and motion vectors establishing feature correspondences between frames at different time instants.

17. The system according to claim 15, wherein the received video data comprises a live uncompressed video stream, and wherein the instructions further comprise identifying the motion vectors as they are generated during video compression.

18. The system according to claim 15, wherein when the estimated mean speed of the vehicle exceeds a predetermined vehicle speed threshold, the instructions further comprise transmitting a video segment comprising video of the vehicle, the video segment having the estimated speed information embedded therein, for vehicle speed confirmation and citation issuance.

19. The system according to claim 15, the instructions further comprising transmitting one or more segments of compressed video data having estimated speed information embedded therein to a remote location for confirmation of vehicle speed, wherein the one or more transmitted segments comprise compressed video of one or more moving vehicles that are candidates for speeding citations.

20. The system according to claim 15, the instructions further comprising, if estimated mean speed of the vehicle exceeds a predetermined vehicle speed threshold, performing speed estimation on a fully decompressed version of the video data.

21. The system according to claim 15, wherein the camera is mounted to one of a stationary structure and a vehicle.

22. The system according to claim 15, wherein the processor and the computer readable medium are integral to the camera.

23. The system according to claim 15, wherein when the estimated mean speed of the vehicle falls outside a predetermined vehicle speed range, the instructions further comprise transmitting a video segment comprising video of the vehicle, the video segment having the estimated speed information embedded therein, for vehicle speed confirmation and citation issuance.

24. A non-transitory computer-readable medium having stored thereon computer-executable instructions for estimating vehicle speed from video motion vector information, the instructions comprising:
receiving video data of a moving vehicle from a camera;
extracting motion vectors in the video data;
identifying and analyzing at least one motion vector cluster representing the moving vehicle;
tracking at least one feature of the at least one motion vector cluster across a plurality of video frames;
estimating frame-to-frame speed and mean speed of the vehicle based at least in part on spatio-temporal coordinates of the at least one tracked feature with the aid of calibration data compressing the video data;

embedding estimated speed information in the compressed video stream; and storing one or more segments of the compressed video stream with embedded estimated speed information for subsequent review.

25. The computer-readable medium of claim 24, wherein the motion vectors are at least one of motion vectors used in the compression process, motion vectors extracted from optical flow data, and motion vectors establishing feature correspondences between frames at different time instants.

26. The computer-readable medium according to claim 24, wherein the received video data comprises a live uncompressed video stream, and wherein the instructions further comprise identifying the motion vectors as they are generated during video compression.

* * * * *